Patented Oct. 2, 1951

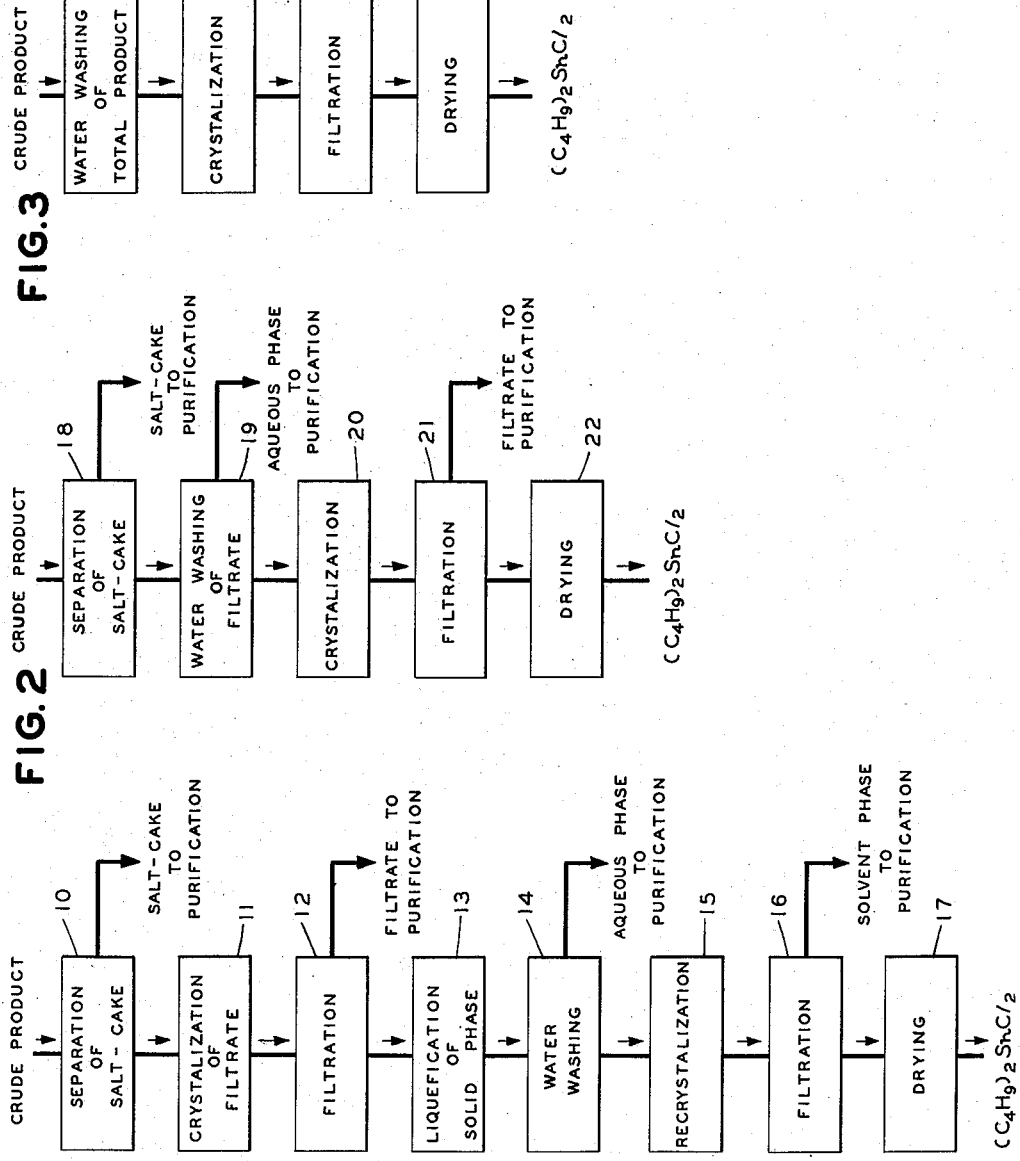

2,569,492

UNITED STATES PATENT OFFICE 2,569,492

PRODUCTION OF ORGANO-TIN COMPOUNDS

Herbert J. Passino, Englewood, and Russell M. Mantell, Newark, N. J., assignors to The M. W. Kellogg Company, Jersey City, N. J., a corporation of Delaware Application December 20, 1949, Serial No. 134,114

15 Claims. (Cl. 260—429)

This invention relates to the production of organo-tin compounds. In one aspect the invention relates to the production of butyl tin chlorides, particularly dibutyl tin dichloride. In another aspect, the invention relates to the recovery of dibutyl tin dichloride from a product comprising monobutyl tin trichloride and stannous chloride as impurities.

The aforementioned product may be obtained by the interaction of butyl chloride, stannic chloride and metallic sodium. This product normally comprises dibutyl tin dichloride, monobutyl tin trichloride and stannous chloride and may also contain, depending upon the reaction conditions, higher molecular weight butyl tin compounds such as tributyl tin monochloride, tetrabutyl tin and hexabutyl di-tin, minor proportions of sodium chloride and metallic sodium and possibly some metallic tin. Although dibutyl tin dichloride is normally a solid, the reaction product is obtained as a liquid inasmuch as monobutyl tin trichloride, tributyl tin monochloride and higher butyl tin compounds which are also formed, are normally liquid. Dibutyl tin dichloride is highly valuable for use as a thermal stabilizer when incorporated in vinyl resins. Therefore, it is desirable to recover it from the aforementioned reaction product as completely as possible.

Heretofore the separation of dibutyl tin dichloride from the aforementioned reaction product has been obtained by resorting to distillation. However, the dibutyl tin dichloride fraction thus recovered still contains monobutyl tin trichloride, tributyl tin monochloride, hexabutyl di-tin and higher organo-tin compounds. It has been found moreover that such distillation tends to bring about a disproportionation of the dibutyl tin dichloride molecule by converting it into monobutyl tin trichloride and/or tributyl tin monochloride when the distillation is carried out at atmospheric or superatmospheric pressures. This reduces the yield of the dibutyl tin dichloride end-product recovered and increases the impurities to be removed. On the other hand, distillation at subatmospheric pressure causes less molecular rearrangement or disproportionation, but requires the use of relatively expensive vacuum-producing apparatus. Solvent extraction of the products of either of these distillation methods fails to remove all of the aforementioned impurities from the product.

It is, therefore, an object of the invention to provide a process for efficient recovery of dibutyl tin dichloride in relatively pure form from a product comprising monobutyl tin trichloride and stannous chloride.

Another object of the invention is to provide a process for efficient recovery of dibutyl tin dichloride in relatively pure form from a product obtained by the interaction of butyl chloride, stannic chloride and metallic sodium, and containing monobutyl tin trichloride and stannous chloride as impurities.

Other objects and advantages inherent in the invention will be apparent to those skilled in the art from the following more detailed disclosure.

According to the invention, in its broad aspect as more fully hereinafter described, a product comprising dibutyl tin dichloride is treated to recover dibutyl tin dichloride by a series of steps which include (A) water-washing a liquid mixture comprising the dibutyl tin dichloride and stannous chloride, to dissolve stannous chloride in the water and separate it from the dibutyl tin dichloride; and (B) cooling a liquid mixture of the dibutyl tin dichloride and containing at least one butyl tin compound lower melting than dibutyl tin dichloride, to separate crystals containing dibutyl tin dichloride and substantially free of lower melting butyl tin compounds. These treatments may be applied to the dibutyl tin dichloride product in either order. If the washing step is applied first and if monobutyl tin trichloride is present, a substantial proportion of the monobutyl tin trichloride will be dissolved in the wash water and recovered with the stannous chloride. If the crystallization step is carried out first, the water-soluble monobutyl tin trichloride will be separated from the dibutyl tin dichloride and will be largely removed from the process prior to the washing step. Furthermore, if the crystallization step is carried out first, it is desirable to have a solvent present in the subsequent water-washing treatment to facilitate contact of the stannous chloride with water, or the crystalline mass may be heated to its melting point prior to water-washing to facilitate such contact.

In one embodiment of this invention, the aforementioned product to be treated is first obtained as a crude liquid product, produced by the interaction of butyl chloride, stannous chloride and metallic sodium, comprising dibutyl tin dichloride, monobutyl tin trichloride, tributyl tin monochloride and minor proportions of tetrabutyl tin, hexabutyl di-tin and stannous chloride, and still smaller proportions of sodium chloride. In addition, this product may contain varying quantities of solvents for the metallic sodium used in carrying out the interaction between the aforementioned butyl chloride and stannic chloride components to produce the liquid product. In accordance with this embodiment of the invention, as illustrated by Figure 1 of the accompanying drawing, which is a flowsheet of the steps pertaining to the recovery of substantially pure dibutyl tin dichloride from the aforementioned liquid product and in which unitary processing stages are designated for greater clarity by rectangular blocks bearing identifying legends, the liquid product is first centrifuged, represented by step 10 in the drawing, to obtain a salt-cake residue comprising essentially most of the sodium chloride originally present in the liquid product and minor quantities of stannous chloride. The remaining filtrate contains dibutyl tin dichloride, the lower melting and lower boiling monobutyl tin trichloride and higher molecular weight butyl tin compounds, the solvent for metallic sodium, stannous chloride in minor proportion and also traces of sodium chloride. If so desired, the salt-cake residue may be washed with a suitable relatively low boiling solvent, such as the solvent previously employed for dissolving the metallic sodium, in order to recover any organo-tin compounds contained therein. The resulting filtrate may be combined with the aforementioned filtrate obtained from the centrifuging step. The filtrate from the centrifuging step, or the aforementioned combined filtrates, is next chilled to a temperature sufficiently low so as to crystallize dibutyl tin dichloride present, as represented by crystallization step 11 in the drawing. The temperature thus employed will depend to some extent upon the boiling point of the relatively high boiling solvent employed in the initial metallic sodium dissolving step and also for the most part upon the ratio of quantity by weight of the solvent to the total reaction product. However, a temperature below at least 0° C. is ordinarily sufficient to effect the aforementioned crystallization of dibutyl tin dichloride, with a temperature of between about —10° C. and about —20° C. or even lower, being preferred. Following the aforementioned crystallization, dibutyl tin dichloride is obtained as a solid phase and, in addition to stannous chloride, contains minor amounts of monobutyl tin trichloride, which is lower melting and lower boiling than dibutyl tin dichloride, and tributyl tin monochloride, traces of tetrabutyl tin and hexabutyl di-tin, which are lower melting but higher boiling than dibutyl tin dichloride, and also may contain sodium chloride. This solid phase is next filtered from the chilled product, which is represented by filtration step 12 in the drawing, and the remaining filtrate comprising a major proportion of monobutyl tin trichloride and higher organo-tin compounds, and solvent if employed in the original interaction step, may, if so desired, be subjected to further purification such as fractional distillation in order to recover any remaining quantities of dibutyl tin dichloride or other organo-tin compounds contained therein, which may be recycled.

The solid phase material obtained from the aforementioned filtration or separation step 12 is next subjected to liquefaction, represented by step 13 in the drawing, in order to make possible the subsequent solvent treatment for the removal of water-soluble impurities which comprise chiefly stannous chloride in an amorphous state, some monobutyl tin trichloride and also traces of sodium chloride. Such liquefaction is necessitated, inasmuch as direct contact of this solid phase material with a suitable solvent for these impurities does not result in their complete absorption or dissolution in the solvent. This condition is encountered by reason that stannous chloride and sodium chloride being in a finely divided state are surrounded by a layer of the crystalline dibutyl tin dichloride in the thus-formed solid phase which prevents the solvent from coming into contact with the stannous chloride and sodium chloride, so that their absorption by the solvent is not attained. Therefore, in order to effect such liquefaction this solid phase material is heated to a temperature sufficiently high to put this material into the liquid state. Hence, it is preferred to heat this solid phase material to a temperature between about 0° C. and about 75° C. for this purpose, with a temperature of about 50° C. being preferred. On the other hand, the aforementioned liquefaction step may also be accomplished by contacting the solid phase material with a suitable solvent for dibutyl tin dichloride, even though such solvent will not bring stannous chloride and other impurities present into solution. Accordingly, the solid phase material may be contacted with a relatively low boiling solvent such as a paraffin, a paraffinic petroleum fraction, 40–60° C. petroleum ether, benzene, toluene, xylene, or carbon tetrachloride in an amount sufficient to bring the dibutyl tin dichloride present into solution. Of these solvents it is preferred to employ such relatively low boiling paraffins as hexane, heptane or octane, and also benzene, in a ratio of about 2 to 3 parts by weight of solvent to the solid residue treated.

The liquid mixture thus obtained, either by the aforementioned heating procedure or solvent contact, is next subjected to suitable water-washing or extraction treatment for the phase separation of water-soluble impurities present, which comprise monobutyl tin trichloride, stannous chloride and traces of sodium chloride, which is represented by water-washing step 14 in the drawing. Thus, the removal of stannous chloride will also effect the removal of monobutyl tin trichloride and sodium chloride which may be present, while dibutyl tin dichloride and other high boiling organo-tin compounds present will not be dissolved. Therefore, the water-washing of the liquid mixture obtained from the aforementioned liquefaction step 13 will bring the water-soluble impurities into the aqueous phase which is formed, while dibutyl tin dichloride and higher organo-tin compounds such as tributyl tin monochloride, tetrabutyl tin and hexabutyl di-tin are obtained in the water-insoluble or organic phase.

The aforementioned water-washing treatment of the liquid mixture obtained from step 13, while effecting the absorption of stannous chloride and other water-soluble impurities present may also result in the mixture thus obtained forming an emulsion, and in some instances may cause the desired dibutyl tin dichloride end-product and other tin compounds present to hydrolyze. In order to prevent such emulsification of the mixture or hydrolysis of dibutyl tin dichloride and other tin compounds present from taking place, it has been found desirable to acidify the wash-water with an acid, which is preferably an inorganic mineral acid such as hydrochloric acid or sulfuric acid. In this respect, it is preferred that the aqueous solution of the inorganic mineral acid be employed in an amount between about 10% and about 15% by weight of the aforementioned liquid mixture treated.

The lower aqueous phase obtained from the aforementioned water-wash treatment, comprising stannous chloride, monobutyl tin trichloride and sodium chloride, is separated and may be subsequently subjected to purification treatment for the recovery of monobutyl tin trichloride if so desired, but which is outside the scope of the present process. The water-insoluble organic phase obtained from the aforementioned water-wash treatment is next separately treated to effect the separation of dibutyl tin dichloride from the remaining higher organo-tin compounds (and solvent, if employed for purposes of liquefying the solid phase material in liquefaction step 13). Accordingly, this material is next chilled to a temperature sufficiently low so as to crystallize the dibutyl tin dichloride component present, which is represented by recrystallization step 15 in the drawing. This recrystallization may be effected by employing similar suitable temperature conditions as employed in the primary crystallization step 11, and in general is satisfactorily performed at a temperature below at least 0° C., with temperatures between about −10° C. and about −20° C., or even lower, being preferred. Following the above-mentioned recrystallization step, substantially pure dibutyl tin dichloride is obtained in the crystalline state, while the other organo-tin components are obtained in the liquid state, or as a solvent phase if a solvent has been previously employed in the liquefaction of the solid phase material in step 13. This chilled mixture is next treated, as represented by filtration step 16 in the drawing, to effect the separation of the dibutyl tin dichloride crystals from the liquid material. This liquid, or solvent phase material, is withdrawn from the crystalline dibutyl tin dichloride residue and may be subjected to further processing or purification for the recovery of the solvent or other organo-tin compounds present. The remaining crystalline dibutyl tin dichloride residue may then be subjected to suitable drying treatment, represented by drying step 17 in the drawing, to effect the recovery of substantially pure dibutyl tin dichloride as a product of the process.

In some instances, depending upon the conditions under which the primary interaction of butyl chloride, stannic chloride and sodium has taken place, undesirable color bodies may be found in the product thus produced which would impair the appearance of the final dibutyl tin dichloride end-product obtained. Where such is the case, the removal of these color bodies may be accomplished through the use of suitable adsorption media such as activated alumina, bauxite or treated clays, prior to the aforementioned recrystalization step 15. Thus the organic phase obtained from water-washing step 14 may be passed through the aforementioned adsorption media for the removal of these color bodies, and the remaining liquid mixture is then subjected to recrystallization in step 15. In the present embodiment of the invention, as illustrated by Figure 1 of the drawing, it will thus be noted that the essential water-washing and cooling steps, as previously indicated, are applied by carrying out the cooling or crystallization step first (represented by step 11), followed by the water-washing step (represented by step 14).

According to another embodiment of the invention, as illustrated by Figure 2 of the drawing, the aforementioned liquid product obtained by the interaction of butyl chloride, stannic chloride and metallic sodium is also first centrifuged to obtain a salt-cake residue, as represented by step 18 in the drawing, and comprising essentially sodium chloride and minor quantities of stannous chloride, and a filtrate comprising dibutyl tin dichloride, monobutyl tin trichloride and higher organo-tin compounds, the solvent for metallic sodium (if employed in the original interaction step), stannous chloride in minor proportions and traces of sodium chloride. However, in this embodiment of the invention, the filtrate thus obtained is subjected to water-washing treatment, represented by step 19 in the drawing, which may be effected by employing an aqueous solution of an inorganic mineral acid such as employed in the water-washing step 14 in the previous embodiment represented by Figure 1 in the drawing, in order to effect the phase separation of water-soluble impurities which comprise substantially all of the stannous chloride, sodium chloride and monobutyl tin trichloride present, from dibutyl tin dichloride, solvent and higher organo-tin compounds which are obtained in the organic phase, and which separation is effected without the aforementioned hydrolysis of dibutyl tin dichloride and higher organo-tin compounds taking place. The aqueous phase thus obtained may be subsequently subjected to suitable purification treatment for the recovery of monobutyl tin trichloride if so desired, but which is outside the scope of the present process.

The water-insoluble organic phase obtained from the above-mentioned water-washing treatment and comprising dibutyl tin dichloride and higher organo-tin compounds and solvent is next chilled to a temperature sufficiently low so as to crystallize the dibutyl tin dichloride component present, which is represented by crystallization step 20 in the drawing, and which may be effected under similar temperature conditions as employed in crystallization step 11 in the previous embodiment represented by Figure 1 of the present process. Following this crystallization, substantially pure dibutyl tin dichloride is obtained in the crystalline state, while the other organo-tin compounds and solvent are obtained in the liquid state. This chilled mixture is next treated to effect the separation of dibutyl tin dichloride crystals from the liquid mixture and is represented by filtration step 21 in the drawing. The liquid phase material or filtrate is next withdrawn from the crystalline dibutyl tin dichloride residue and may be subjected to further processing or purification for the recovery of higher organo-tin compounds and solvent present. The remaining crystalline dibutyl tin dichloride residue may then be subjected to suitable drying treatment, represented by drying step 22 in the drawing, to effect the recovery of substantially pure dibutyl tin dichloride as a product of the process. In this embodiment of the invention, as illustrated by Figure 2 of the drawing, it will thus be noted that the essential water-washing and cooling steps, as previously indicated, are applied by carrying out the water-washing step first (represented by step 19), followed by the cooling or crystallization step (represented by step 20).

According to still another embodiment of the invention, as illustrated by Figure 3 in the drawing, the liquid product obtained by the interaction of butyl chloride, stannic chloride and metallic sodium is water-washed directly after the interaction of the aforementioned components, without prior centrifuging or separation of a salt-cake residue comprising essentially sodium chloride, stannous chloride and tin, as effected in the previous embodiments. Accordingly, this liquid reaction product is subjected to water-washing treatment, as represented by step 23 in the drawing, and which may be effected by employing an aqueous solution of an inorganic mineral acid such as employed in water-washing steps 14 and 19 in the previous embodiments represented by Figures 1 and 2, respectively. This water-washing treatment results in the phase separation of water-soluble impurities comprising substantially all of the stannous chloride, sodium chloride and monobutyl tin trichloride present from dibutyl tin dichloride, higher organo-tin compounds and solvent which are obtained in the organic phase. The aqueous phase may be subjected to suitable purification treatment for the removal of monobutyl tin trichloride, if so desired, by processes which are outside the scope of the present invention.

The water-insoluble organic phase obtained from the aforementioned water-washing treatment and comprising dibutyl tin dichloride, higher organo-tin compounds and solvent, is next chilled to a temperature sufficiently low so as to crystallize the dibutyl tin dichloride component present, which is represented by crystallization step 24 in the drawing, and which may be effected under similar temperature conditions as employed in crystallization steps 11 and 20 in the previous embodiments of the present process, represented by Figures 1 and 2, respectively. Following this crystallization, substantially pure dibutyl tin dichloride is obtained in the crystalline state, while the other organo-tin compounds and solvent are obtained in the liquid state. This chilled mixture is next treated to effect the separation of dibutyl tin dichloride crystals from the liquid mixture, and is represented by filtration step 25 in the drawing. The liquid phase material or filtrate is next withdrawn from the crystalline dibutyl tin dichloride residue and may be subjected to further processing or purification for the recovery of higher organo-tin compounds and solvent present. The remaining crystalline dibutyl tin dichloride residue may then be subjected to suitable drying treatment, represented by drying step 26 in the drawing, to effect the recovery of substantially pure dibutyl tin dichloride as a product of the process. In this embodiment of the invention, as illustrated by Figure 3 of the drawing, it will thus be noted that the essential water-washing and cooling steps, as previously indicated, are applied by carrying out the water-washing step first (represented by step 23), followed by the cooling or crystallization step (represented by step 24).

We claim:

1. In a process for producing dibutyl tin dichloride wherein reagents are interacted to produce a liquid product mixture comprising said dibutyl tin dichloride, stannous chloride and at least one butyl tin compound lower melting than dibutyl tin dichloride, the method for recovering a relatively pure dibutyl tin dichloride product which comprises the step of washing a liquid mixture comprising said dibutyl tin dichloride and stannous chloride with water to dissolve stannous chloride in the water and separate it from dibutyl tin dichloride, and the step of cooling a liquid mixture comprising said dibutyl tin dichloride and said butyl tin compound to separate crystals containing dibutyl tin dichloride and substantially free from said butyl tin compound.

2. In a process for producing dibutyl tin dichloride wherein reagents are interacted to produce a liquid product mixture comprising said dibutyl tin dichloride, monobutyl tin trichloride and stannous chloride, the method for recovering a relatively pure dibutyl tin dichloride product which comprises the step of washing a liquid mixture comprising said dibutyl tin dichloride and stannous chloride with water to dissolve stannous chloride in the water and separate it from dibutyl tin dichloride, and the step of cooling a liquid mixture comprising said dibutyl tin dichloride and monobutyl tin trichloride to separate crystals containing dibutyl tin dichloride and substantially free from monobutyl tin trichloride.

3. In a process for producing dibutyl tin dichloride wherein reagents are interacted to produce a liquid product mixture comprising said dibutyl tin dichloride, stannous chloride and at least one butyl tin compound lower melting but higher boiling than dibutyl tin dichloride, the method for recovering a relatively pure dibutyl tin dichloride product which comprises the step of washing a liquid mixture comprising said dibutyl tin dichloride and stannous chloride with water to dissolve stannous chloride in the water and separate it from dibutyl tin dichloride, and the step of cooling a liquid mixture comprising said dibutyl tin dichloride and said butyl tin compound to separate crystals containing dibutyl tin dichloride and substantially free from said butyl tin compound.

4. In a process for producing dibutyl tin dichloride wherein reagents are interacted to produce a liquid product mixture comprising said dibutyl tin dichloride, tributyl tin monochloride and stannous chloride, the method for recovering a relatively pure dibutyl tin dichloride product which comprises the step of washing a liquid mixture comprising said dibutyl tin dichloride and stannous chloride with water to dissolve stannous chloride in the water and separate it from dibutyl tin dichloride, and the step of cooling a liquid mixture comprising said dibutyl tin dichloride and tributyl tin monochloride to separate crystals containing dibutyl tin dichloride and substantially free from tributyl tin monochloride.

5. In a process for producing dibutyl tin dichloride wherein reagents are interacted to produce a liquid product mixture comprising said dibutyl tin dichloride, stannous chloride and at least one butyl tin compound lower melting than dibutyl tin dichloride, the method for recovering a relatively pure dibutyl tin dichloride product which comprises the step of washing a liquid mixture comprising said dibutyl tin dichloride and stannous chloride with water in the presence of a solvent for dibutyl tin dichloride to dissolve stannous chloride in the water and separate it from dibutyl tin dichloride, and the step of cooling a liquid mixture comprising said dibutyl tin dichloride and said butyl tin compound to separate crystals containing dibutyl tin dichloride and substantially free from said butyl tin compound.

6. In a process for producing dibutyl tin dichloride wherein butyl chloride, stannic chloride and metallic sodium are interacted to produce a liquid product mixture comprising said dibutyl tin dichloride, stannous chloride and at least one butyl tin compound lower melting than dibutyl tin dichloride, the method for recovering a relatively pure dibutyl tin dichloride product which comprises the step of washing a liquid mixture comprising said dibutyl tin dichloride and stannous chloride with water to dissolve stannous chloride in the water and separate it from dibutyl tin dichloride, and the step of cooling a liquid mixture comprising said dibutyl tin dichloride and said butyl tin compound to separate crystals containing dibutyl tin dichloride and substantially free from said butyl tin compound.

7. In a process for producing dibutyl tin dichloride wherein butyl chloride, stannic chloride and metallic sodium are interacted to produce a liquid product mixture comprising said dibutyl tin dichloride, stannous chloride and at least one butyl tin compound lower melting but higher boiling than dibutyl tin dichloride, the method for recovering a relatively pure dibutyl tin dichloride product which comprises the step of washing a liquid mixture comprising said dibutyl tin dichloride and stannous chloride with water to dissolve stannous chloride in the water and separate it from dibutyl tin dichloride, and the step of cooling a liquid mixture comprising said dibutyl tin dichloride and said butyl tin compound to separate crystals containing dibutyl tin dichloride and substantially free from said butyl tin compound.

8. In a process for producing dibutyl tin dichloride wherein butyl chloride, stannic chloride and metallic sodium are interacted to produce a liquid product mixture comprising said dibutyl tin dichloride, stannous chloride and at least one butyl tin compound lower melting than dibutyl tin dichloride, the method for recovering a relatively pure dibutyl tin dichloride product which comprises the step of washing a liquid mixture comprising said dibutyl tin dichloride and stannous chloride with water in the presence of a solvent for dibutyl tin dichloride to dissolve stannous chloride in the water and separate it from dibutyl tin dichloride, and the step of cooling a liquid mixture comprising said dibutyl tin dichloride and said butyl tin compound to separate crystals containing dibutyl tin dichloride and substantially free from said butyl tin compound.

9. In a process for producing dibutyl tin dichloride wherein reagents are interacted to produce a liquid product mixture comprising said dibutyl tin dichloride, monobutyl tin trichloride and stannous chloride, the method for recovering a relatively pure dibutyl tin dichloride product which comprises the steps of cooling a liquid mixture comprising said dibutyl tin dichloride, stannous chloride and monobutyl tin trichloride to form a solid phase comprising stannous chloride and crystals of dibutyl tin dichloride substantially free from monobutyl tin trichloride, separating said solid phase from said liquid mixture, liquefying said solid phase, and washing said liquefied phase with water to dissolve stannous chloride in the water and separate it from dibutyl tin dichloride.

10. In a process for producing dibutyl tin dichloride wherein butyl chloride, stannic chloride and metallic sodium are interacted to produce a liquid product mixture comprising said dibutyl tin dichloride, monobutyl tin trichloride and stannous chloride, the method for recovering a relatively pure dibutyl tin dichloride product which comprises the steps of cooling a liquid mixture comprising said dibutyl tin dichloride, stannous chloride and monobutyl tin trichloride to form a solid phase comprising stannous chloride and crystals of dibutyl tin dichloride substantially free from monobutyl tin trichloride, separating said solid phase from said liquid mixture, liquefying said solid phase, and washing said liquefied phase with water to dissolve stannous chloride in the water and separate it from dibutyl tin dichloride.

11. In a process for producing dibutyl tin dichloride wherein reagents are interacted to produce a liquid product mixture comprising said dibutyl tin dichloride, monobutyl tin trichloride and stannous chloride, the method for recovering a relatively pure dibutyl tin dichloride product which comprises the steps of washing a liquid mixture comprising said dibutyl tin dichloride, stannous chloride and monobutyl tin trichloride with water to form an organic liquid base comprising dibutyl tin dichloride and an aqueous phase comprising monobutyl tin trichloride and stannous chloride, separating said phases, cooling said organic phase to form a solid phase comprising crystals of dibutyl tin dichloride substantially free from said monobutyl tin trichloride, and separating said solid phase from said organic phase.

12. In a process for producing dibutyl tin dichloride wherein butyl chloride, stannic chloride and metallic sodium are interacted to produce a liquid product mixture comprising said dibutyl tin dichloride, monobutyl tin trichloride and stannous chloride, the method for recovering a relatively pure dibutyl tin dichloride product which comprises the steps of washing a liquid mixture comprising said dibutyl tin dichloride, stannous chloride and monobutyl tin trichloride with water to form an organic liquid phase comprising dibutyl tin dichloride and an aqueous phase comprising monobutyl tin trichloride and stannous chloride, separating said phases, cooling said organic phase to form a solid phase comprising crystals of dibutyl tin dichloride substantially free from said monobutyl tin trichloride, and separating said solid phase from said organic phase.

13. In a process for producing dibutyl tin dichloride wherein butyl chloride, stannic chloride and metallic sodium are interacted to produce a liquid product mixture comprising said dibutyl tin dichloride, monobutyl tin trichloride and stannous chloride, the method for recovering a relatively pure dibutyl tin dichloride product which comprises the steps of cooling said liquid product to a temperature below about 0° C. to form a solid phase comprising stannous chloride and crystals of dibutyl tin dichloride substantially free from monobutyl tin trichloride, separating said solid phase from said liquid product, contacting said solid phase with a solvent for dibutyl tin dichloride in a weight ratio of approximately 2:3 to form a liquid mixture comprising dibutyl tin dichloride and stannous chloride, washing said liquid mixture with an aqueous solution of an inorganic mineral acid in an amount between about 10% and about 15% by weight of said liquid mixture to form an organic phase comprising dibutyl tin dichloride and solvent and an aqueous phase comprising stannous chloride, separating said phases, cooling said organic phase to a temperature below about 0° C. to form a solid phase comprising crystals of dibutyl tin dichloride and a liquid phase comprising solvent, and separating crystals containing dibutyl tin dichloride from said liquid phase.

14. In a process for producing dibutyl tin dichloride wherein butyl chloride, stannic chloride and metallic sodium are interacted to produce a liquid product mixture comprising said dibutyl tin dichloride, monobutyl tin trichloride and stannous chloride, the method for recovering a relatively pure dibutyl tin dichloride product which comprises the steps of washing a liquid mixture comprising said dibutyl tin dichloride, stannous chloride and monobutyl tin trichloride with an aqueous solution of an inorganic mineral acid in an amount between about 10% and about 15% by weight of said liquid mixture to form an organic liquid phase comprising dibutyl tin dichloride and an aqueous phase comprising monobutyl tin trichloride and stannous chloride, separating said phases, cooling said organic phase to a temperature below about 0° C. to form a solid phase comprising crystals of dibutyl tin dichloride substantially free from said monobutyl tin trichloride, and separating said solid phase from said organic phase.

15. In a process for producing dibutyl tin dichloride wherein butyl chloride, stannic chloride and metallic sodium are interacted to produce a liquid product mixture comprising said dibutyl tin dichloride, monobutyl tin trichloride and stannous chloride, the method for recovering a relatively pure dibutyl tin dichloride product which comprises the steps of washing the total product of said interaction comprising said dibutyl tin dichloride, stannous chloride and monobutyl tin trichloride with an aqueous solution of an inorganic mineral acid in an amount between about 10% and about 15% by weight of said liquid mixture to form an organic liquid phase comprising dibutyl tin dichloride and an aqueous phase comprising monobutyl tin trichloride and stannous chloride, separating said phases, cooling said organic phase to a temperature below about 0° C. to form a solid phase comprising crystals of dibutyl tin dichloride substantially free from said monobutyl tin trichloride, and separating said solid phase from said organic phase.

HERBERT J. PASSINO.
RUSSELL M. MANTELL.

REFERENCES CITED

The following references are of record in the file of this patent:

UNITED STATES PATENTS

| Number | Name | Date |
| --- | --- | --- |
| 2,431,038 | Harris | Nov. 18, 1947 |